United States Patent
Rolston et al.

(10) Patent No.: US 9,990,584 B2
(45) Date of Patent: Jun. 5, 2018

(54) RULE-BASED REGISTER CHECKING FOR DIGITAL VOLTAGE REGULATOR CONTROLLERS

(71) Applicant: Infineon Technologies Austria AG, Villach (AT)

(72) Inventors: Richard Rolston, Redondo Beach, CA (US); Ken Ostrom, Palos Verdes Estates, CA (US); Benjamim Tang, Rancho Palos Verdes, CA (US); Vrezh Yetanikyan, Pasadena, CA (US); Allen Sakai, Rancho Palos Verdes, CA (US); Tim Ng, Monterey Park, CA (US)

(73) Assignee: Infineon Technologies Austria AG, Villach (AT)

( * ) Notice: Subject to any disclaimer, the term of this patent is extended or adjusted under 35 U.S.C. 154(b) by 793 days.

(21) Appl. No.: 14/259,262

(22) Filed: Apr. 23, 2014

(65) Prior Publication Data
US 2015/0310331 A1    Oct. 29, 2015

(51) Int. Cl.
| G05D 3/12 | (2006.01) |
|---|---|
| G05D 5/00 | (2006.01) |
| G05D 9/00 | (2006.01) |
| G05D 11/00 | (2006.01) |
| G05D 17/00 | (2006.01) |
| G06N 5/02 | (2006.01) |
| G05B 15/02 | (2006.01) |
| G05F 1/10 | (2006.01) |
| G06N 99/00 | (2010.01) |

(52) U.S. Cl.
CPC .............. *G06N 5/027* (2013.01); *G05B 15/02* (2013.01); *G05F 1/10* (2013.01); *G06N 5/025* (2013.01); *G06N 99/005* (2013.01)

(58) Field of Classification Search
None
See application file for complete search history.

(56) References Cited

U.S. PATENT DOCUMENTS

| 2006/0015616 A1* | 1/2006 | Chapuis | G06F 1/26 709/225 |
|---|---|---|---|
| 2007/0262132 A1* | 11/2007 | Burton | G06F 1/26 235/375 |

(Continued)

FOREIGN PATENT DOCUMENTS

| CN | 102037427 A | 4/2011 |
|---|---|---|
| CN | 103105181 A | 5/2013 |

(Continued)

*Primary Examiner* — Diem Cao
(74) *Attorney, Agent, or Firm* — Murphy, Bilak & Homiller, PLLC (57) ABSTRACT

A method of rule-based register checking for a digital voltage regulator controller includes: defining register settings for the digital voltage regulator via a GUI (graphical user interface) based controller parameter configuration system; accessing a rule-based checker by the GUI based configuration system to check for rule violations in the register settings; and uploading the register settings from the GUI based configuration system to the digital voltage regulator controller after checking the register settings for rule violations. A non-transitory computer readable medium storing a computer program operable to implement the rule-based register checking is also provided.

16 Claims, 7 Drawing Sheets

(56) References Cited

U.S. PATENT DOCUMENTS

| | | | |
|---|---|---|---|
| 2011/0023001 A1 | 1/2011 | Giffel | |
| 2013/0125085 A1* | 5/2013 | Shimizu | G06F 17/5063 |
| | | | 716/139 |
| 2013/0335043 A1* | 12/2013 | He | H02M 3/04 |
| | | | 323/234 |
| 2014/0107857 A1* | 4/2014 | Yang | G06F 1/26 |
| | | | 700/298 |

FOREIGN PATENT DOCUMENTS

| | | |
|---|---|---|
| CN | 103106293 A | 5/2013 |
| JP | 11184905 A | 7/1999 |
| JP | 11296366 A | 10/1999 |

\* cited by examiner

RULE-BASED REGISTER CHECKING FOR DIGITAL VOLTAGE REGULATOR CONTROLLERS

TECHNICAL FIELD

The instant application relates to digital voltage regulator controllers, more particularly to checking digital voltage regulator controller register values for rule violations.

BACKGROUND

Voltage regulators are widely used in modern electronic systems for a variety of applications such as computing (server and mobile) and POLs (Point-of-Load Systems) for telecommunications because of their high efficiency and small amount of area/volume consumed by such converters. Widely accepted voltage regulator topologies include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current and demanding transient requirements. Digital voltage regulators are well suited to implement high performance regulators, as they can implement sophisticated control algorithms using dynamic, multi-mode, and non-linear approaches, and provide a rich set of telemetry and protection features, with flexible capability provided through programmable configurability.

Digital voltage regulator controllers are typically configured by physical registers that contain parameter values that limit, determine or otherwise control the operation of a voltage regulator. These values can be modified by commands received over a digital interface, typically a serial interface such as I2C or PMBUS, and stored in a non-volatile memory in the controller such as flash, EEPROM, or one-time-programmable fuse based memories, so that the controller parameter values when starting up or reset are programmable, and the voltage regulator behavior is configurable. For example, the physical registers can store min/max voltage and current information, timing information, temperature limits, etc.

A parameter configuration system, typically including a computer and software, allows the user to generate, manipulate, and manage parameter values through a user interface, and communicate with the controller via a physical interface to download, upload, modify, and store register settings. Configuration files are data files which may be in text, binary or other formats, are generated and accessed by the configuration system, and contain register settings for the digital voltage regulator controller. These settings typically are in the form of pairs of register addresses and register values. The register settings control the behavior of the controller, and certain settings or combinations of settings can cause the behavior of the digital voltage regulator controller to be suboptimal or even lead to undesirable behavior. As such, it is desirable to check the register settings for rule violations and to occasionally update the rules used to check for register violations e.g. to account for newly acquired data, different regulator designs or load requirements, different board components (such as difference capacitors and/or inductors), different board designs, etc. Otherwise, the rules used to check for register violations can become dated and unreliable.

SUMMARY

According to an embodiment a method of rule-based register checking for a digital voltage regulator controller, the method comprises: defining register settings for the digital voltage regulator via a GUI (graphical user interface) based controller parameter configuration system; accessing a rule-based checker by the GUI based configuration system to check for rule violations in the register settings; and uploading the register settings from the GUI based configuration system to the digital voltage regulator controller after checking the register settings for rule violations.

According to an embodiment of a non-transitory computer readable medium storing a computer program operable to implement rule-based register checking for a digital voltage regulator controller, the computer program comprises: program instructions to define register settings for the digital voltage regulator via a GUI based controller parameter configuration system; program instructions to access a rule-based checker by the GUI based configuration system to check for rule violations in the register settings; and program instructions to upload the register settings from the GUI based configuration system to the digital voltage regulator controller after checking the register settings for rule violations.

Those skilled in the art will recognize additional features and advantages upon reading the following detailed description and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide rule-based register checking for digital voltage regulator controllers that is implemented by a GUI (graphical user interface) based controller parameter configuration system. The GUI based configuration system accesses a rule-based checker to check for rule violations in the register settings of a digital voltage regulator controller. The rule-based checker carefully looks at the register settings to find mistakes, problems, etc., or to make sure there is nothing wrong with the register settings. One or more rules implemented by the rule-based checker as part of the register checking process can be updated without requiring a new release of the GUI based controller parameter configuration system. This way, users can benefit from modified rules without having to install a new version of the GUI based controller parameter configuration system.

Figure 1:
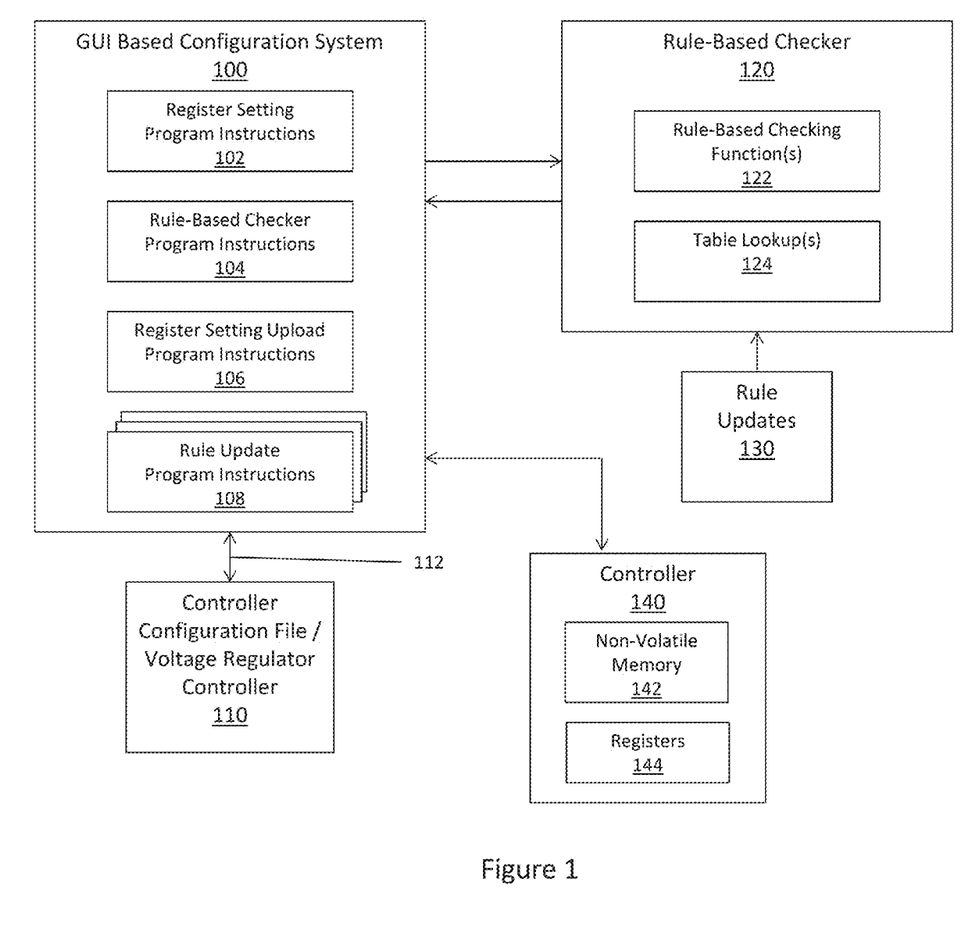
FIG. 1 illustrates a block diagram of an embodiment of a GUI based controller parameter configuration system for providing rule-based register checking for a digital voltage regulator controller.

FIG. 1 illustrates a non-limiting exemplary embodiment of a GUI based controller parameter configuration system 100 configured to provide rule-based register checking for a digital voltage regulator controller 140. The GUI based controller parameter configuration system 100 can include a computing device such as a PC (personal computer), server, mobile device, etc., a computer-based interface like USB (universal serial bus), a controller interface such as I2C, an interface translator between USB and 120, and/or a computer program. The GUI based controller parameter configuration system 100 can be web-based. For example, the GUI based controller parameter configuration system 100 can be entirely run on a browser. In this case, the rules are updated on a server so there is no need to update the actual GUI. In another case, the GUI runs on a browser and the rules are implemented by a separate program. In still another case, the GUI runs on a browser and the rules are available as a separate file accessed via the GUI. In still another case, the GUI runs on a PC connected to the web and the rules are downloaded from the web. In another example, the GUI runs on a PC connected to the web and the rules are run on the web.

In each case, the GUI based controller parameter configuration system 100 provides users a method for loading configuration parameters from a file or from the digital voltage regulator controller 140, directly entering into the GUI based controller parameter configuration system 100, modifying the parameters via the GUI based controller parameter configuration system 100, and defining register settings (content) for the digital voltage regulator controller 140 based on the modified parameters. The term 'computer program' used herein refers to a sequence of program instructions, written to perform a specified task with a computer. A computer requires programs to function, typically executing program instructions in a central processor. The program can be stored on a non-transitory computer readable medium and has an executable form that the computer can use directly to execute the instructions. The term 'execution' as used herein is the process by which a computer or a virtual machine performs the instructions of a computer program. The instructions in the program trigger sequences of actions on the executing machine. Those actions produce effects according to the semantics of the instructions in the program.

Figure 2:
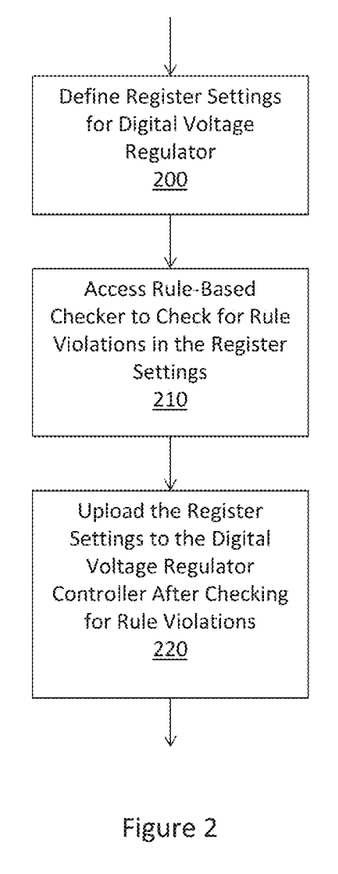
FIG. 2 illustrates a flow diagram of an embodiment of rule-based register checking for a digital voltage regulator controller.

Operation of the GUI based controller parameter configuration system 100 is described next with reference to FIG. 2. The GUI based controller parameter configuration system 100 includes program instructions 102 to define register settings for a digital voltage regulator controller 140 via the GUI based controller parameter configuration system 100 (Block 200). For example, the GUI based controller parameter configuration system 100 can access a configuration file 110 which contains register settings for the digital voltage regulator controller 140. The register settings contained in the configuration file 110 can be in the form of pairs of register addresses and register values. The register settings control the behavior of the digital voltage regulator controller 140. In another case, the GUI based controller parameter configuration system 100 can access the digital voltage regulator controller 140 to retrieve the register settings from the digital voltage regulator controller 140 e.g. over a communication interface 112. The communication interface 112 can be wired, wireless, optical, etc. and the corresponding communication connection can be local such as USB, 120, etc. or remote such as over the Internet, ftp, etc. In each case, the GUI based controller parameter configuration system 100 presents the register settings to a user through a visual display. The user can modify the register settings via the GUI based controller parameter configuration system 100.

The GUI based controller parameter configuration system 100 further includes program instructions 104 that enable the GUI based controller parameter configuration system 100 to access a rule-based checker 120 in order to check for rule violations in the register settings (Block 210). The register settings can be simple min/max values or represent more complicated functions e.g. which can depend on other register setting values and/or regulator system conditions. The rule-based checker 120 implements rules that check the register settings for rule violations. In some embodiments, the rule-based checker 120 prevents the user from selecting parameter values that violate a rule. In other embodiments, the rule-based checker 120 allows the user to select one or more parameter values even if a selected value violates a rule. This could allow for modifying a parameter value so that it violates a rule.

The GUI based controller parameter configuration system 100 also includes program instructions 106 to upload the register settings from the GUI based configuration system 100 to the digital voltage regulator controller 140 after checking the register settings for rule violations (Block 220). In one case, the GUI based configuration system 100 indirectly uploads the register settings to the digital voltage regulator controller 140 by writing the register settings to the corresponding configuration file 110 for the digital voltage regulator controller 140. In another case, the GUI based configuration system 100 directly uploads the register settings to the digital voltage regulator controller 140 e.g. over a communication interface 112 between the GUI based configuration system 100 and the digital voltage regulator controller 140. The communication interface 112 can be wired, wireless, optical, etc. and the corresponding communication connection can be local such as USB, 120, etc. or remote such as over the Internet, ftp, etc. as previously described herein.

The communication interface 112 can be used to upload i.e. transfer full/partial register setting values from the GUI based controller parameter configuration system 100 to the digital voltage regulator controller 140, and download (transfer) full/partial register setting values from the controller to the GUI based controller parameter configuration system 100. The controller 140 can include non-volatile memory 142 such as flash, EEPROM, one-time-programmable fuse based memories, etc. for storing register setting values transferred from the controller registers 144 to the non-volatile memory 142. Register setting values can be transferred from a configuration file 110 to the GUI based controller parameter configuration system 100, and the GUI based controller parameter configuration system 100 can save modified register setting values to the configuration file 110.

The GUI based controller parameter configuration system 100 can include further program instructions, such as program instructions 108 to update one or more of the rules 130 implemented by the rule-based checker 120 as part of checking the register settings for rule violations. The GUI based controller parameter configuration system 100 can notify the user of a rule change, and the user can decide whether to download/install the updated rule(s). In another case, the GUI based controller parameter configuration system 100 or the rule-based checker 120 automatically downloads/installs rule updates without user action. In each case, rule updates are implemented by the rule-based checker 120 without requiring a new release of the GUI based controller parameter configuration system 100. The rule-based checker 120 is sufficiently decoupled from the source code of the GUI based controller parameter configuration system 100 such that rule updates can be implemented by the rule-based checker 120 without having to revise the source code of the GUI based controller parameter configuration system 100 i.e. without requiring a new release of the GUI based controller parameter configuration system 100.

In one embodiment, the rule-based checker 120 accessed by the GUI based configuration system 100 is a computer program launched by the GUI based controller parameter configuration system 100. For example, the computer program can be a spreadsheet and functions supported by the spreadsheet can be used to identify rule violations for the register settings of the digital voltage regulator controller 140. Other types of computer programs can be used such as other standard commercially-available programs or custom designed (coded) programs.

In each case, the computer program is separate from the GUI based configuration system 100 and checks the register settings programmed by the user of the GUI based controller parameter configuration system 100 for rule violations. The computer program can implement rule-based checking functions 122 and/or table lookups 124 in order to check the register settings for rule violations. The rule-based checking functions 122 and table lookups 124 can be updated without requiring a new release of the GUI based controller parameter configuration system 100.

One or more of the rule-based checking functions can include interdependencies between values contained in different registers of the digital voltage regulator controller 140. For example, some rules can involve interdependencies based on the min, max, or value of other registers. In one specific example, the max value of a temperature-related register setting sv_temp_max is based on the lesser of the min value of two other register settings: sv0_temp_shut_thresh and sv1_temp_shut_thresh as given by:

$$\text{MAX}(sv\_temp\_max) = \text{MIN}\{\text{MIN}(sv0\_temp\_shut\_thresh), \text{MIN}(sv1\_temp\_shut\_thresh)\} - 5 \quad (1)$$

In another specific example, the max value for a current-related register setting sv0_pk_ilimit_warn_dvid is given by:

$$\text{MAX}(sv0\_pk\_ilimit\_warn\_dvid) = sv0\_nph\_max * 55 \quad (2)$$

where sv0_nph_max is a different register setting.

Other rule-based checking functions implemented by the computer program can be part-dependent. For example, some min and/or max register values can depend on the type of voltage regulator being controlled e.g. buck, boost, buck-boost, forward, flyback, half-bridge, full-bridge, SEPIC, multiphase buck converter, etc. Other min and/or max register values can depend on interface type (e.g. I2C, PMBus, etc.), load type (e.g. server, mobile, point-of-load systems, etc.), specific customer requirements, etc. For example, the min and max of an input voltage-related register parameter sv1_ki_delta_vin_scale_enable can be 0 if the voltage regulator is used in a point-of-load system and 1 otherwise. In each case, rule violations can be identified by determining whether particular register values violate the corresponding rule-based checking functions.

Figure 3:
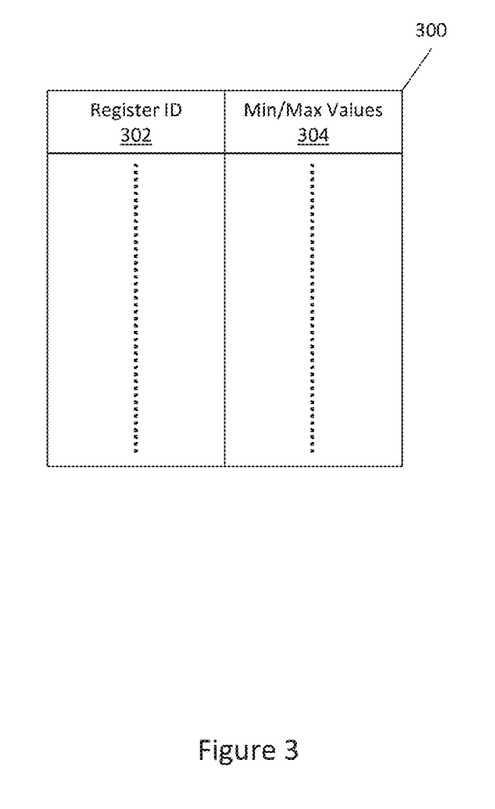
FIG. 3 illustrates a block diagram of an embodiment of table lookup used as part of rule-based register checking for a digital voltage regulator controller.

FIG. 3 illustrates an embodiment of a table lookup 300 implemented by the rule-based checker computer program. The table lookup 300 includes pairs of register addresses (IDs) 302 and register values 304. In this case, 'register' means a logical register representing one or more bits within a physical 16-bit register of the digital voltage regulator controller 140. For a simple type of rule, min and/or max values 304 can be specified by integers in the lookup table 300. For example, a register value 304 can have a min of 5 and a max of 10. Rule violations can be identified by accessing the table 300 and identifying whether particular register values violate the corresponding min/max values 304 stored in the table 300.

In general, one or more of the rule-based checking functions 122 and/or table lookups 124 can be updated without requiring a new release of the GUI based controller parameter configuration system 100.

At least part of the rule-based checker 120 can be implemented by the GUI based controller parameter configuration system 100. In one embodiment, the GUI based controller parameter configuration system 100 implements lookup tables 124 of min/max values e.g. as shown in FIG. 3 for at least some of the register parameter values. Rule violations can be identified by accessing the table lookup 124 and identifying whether particular register values violate the corresponding min/max values stored in the table 124. The tables 124 can correspond to different rule-checking scenarios.

Another part of the rule-based checker 120 can be implemented by a computer program e.g. a spreadsheet launched by the GUI based controller parameter configuration system 100 as previously described herein. At least one min/max parameter value stored in the tables 124 and/or one or more rule-based checking functions 122 implemented by the computer program can be updated without requiring a new release of the GUI based controller parameter configuration system 100.

Figure 4:
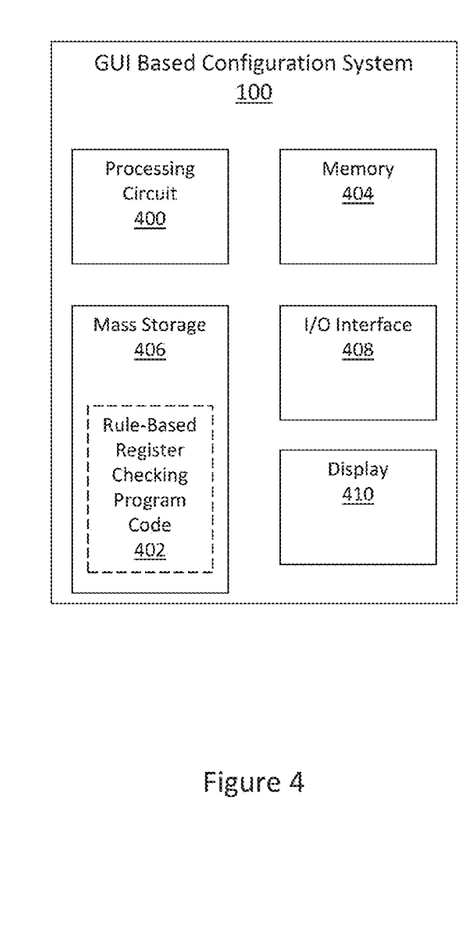
FIG. 4 illustrates a block diagram of another embodiment of a GUI based controller parameter configuration system for providing rule-based register checking for a digital voltage regulator controller.

FIG. 4 illustrates an embodiment of the GUI based controller parameter configuration system 100. The GUI based controller parameter configuration system 100 is a computer in this embodiment, which can be a PC, laptop, server, mobile device, or any other electric device with computing functions. The GUI based controller parameter configuration system 100 includes a processing circuit 400 which can include digital and/or analog circuitry, such as one or more processors, ASICs (application-specific integrated circuits), etc. for executing program code 402 which implements the rule-based register checking processes described herein. The GUI based controller parameter configuration system 100 also includes volatile and/or nonvolatile memory 404, such as DRAM (dynamic random access memory), FLASH, etc., and mass storage 406 such as a HDD (hard disk drive), optical drive, SSD (solid-state drive), hybrid SSD, etc. for storing the rule-based register checking program code 402 and related data processed and accessed by the processing circuit 400 during execution of the program code 402. The GUI based controller parameter configuration system 100 also has an I/O (input/output) interface 408 for sending and receiving information, including receiving and writing configuration files for a digital voltage regulator controller 140 and/or accessing the digital voltage regulator controller 140. The GUI based controller parameter configuration system 100 has a display 410 such as a monitor, flat screen, touch screen, projector, etc. for visually displaying register defining and rule-checking processes described herein. For example, the display 410 can indicate to the user which register settings are flagged for an error by the rule-based checker 120 and which of the user-programmed register settings are flagged for a warning by the rule-based checker 120.

Figure 5:
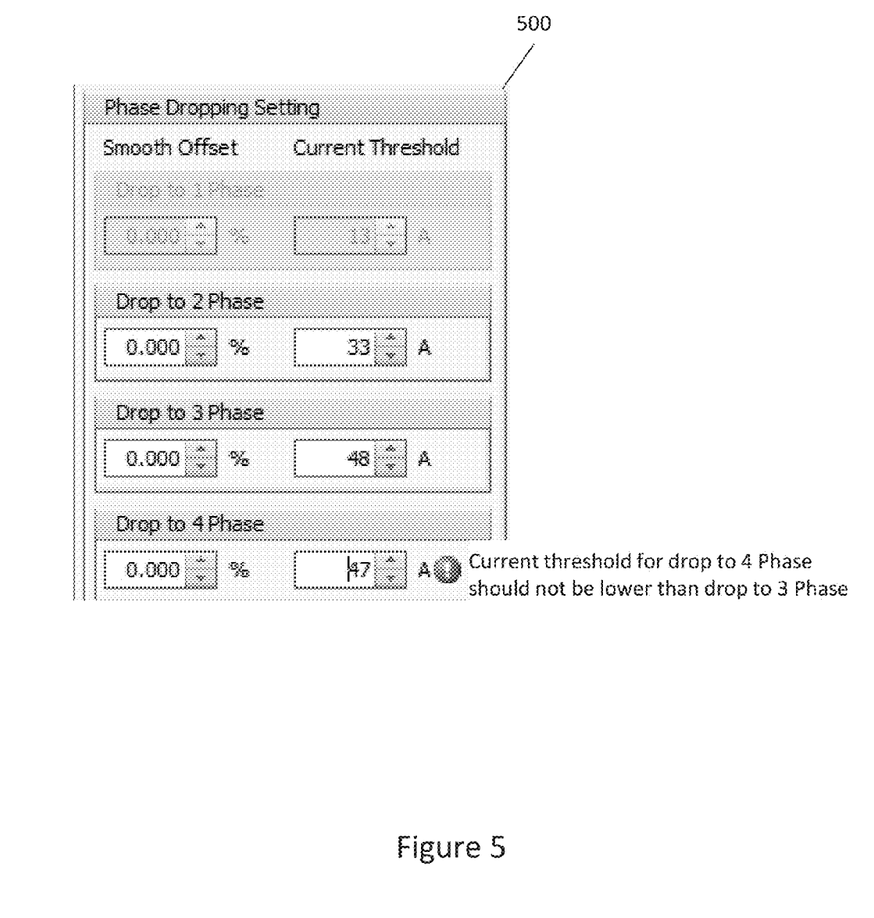
FIG. 5 illustrates a screen capture of rule-based register checking results for a digital voltage regulator controller.

FIG. 5 illustrates an embodiment of a window 500 presented by the display 410 of the GUI based controller parameter configuration system 100. In this case, the user can determine when different phases of a multiphase regulator are dropped e.g. under light-load conditions. The user can select a percentage (%) or absolute current value (A) at which each of the phases is dropped. A dropped phase no longer contributes current to the load. In the example shown in FIG. 5, the user attempts to set a lower current threshold for dropping the fourth phase (47 A) as compared to the third phase (48 A).

The rule-based checker 120 accessed by the GUI based configuration system 100 includes a rule which generates a warning (!) that indicates the user has selected an undesirable current threshold value for dropping the fourth phase. Instead of a warning, the rule-based checker 120 could outright prevent the user from selecting an undesirable current threshold for phase dropping. The acceptable current thresholds for dropping the different thresholds may change on occasion. The embodiments described herein allow for one or more of the phase current dropping thresholds to be updated without requiring a new release of the GUI based controller parameter configuration system 100 e.g. by updating the corresponding values in a lookup table 124 such as the lookup table shown in FIG. 3 or by modifying the corresponding rule-based checking function 122.

Figure 6:
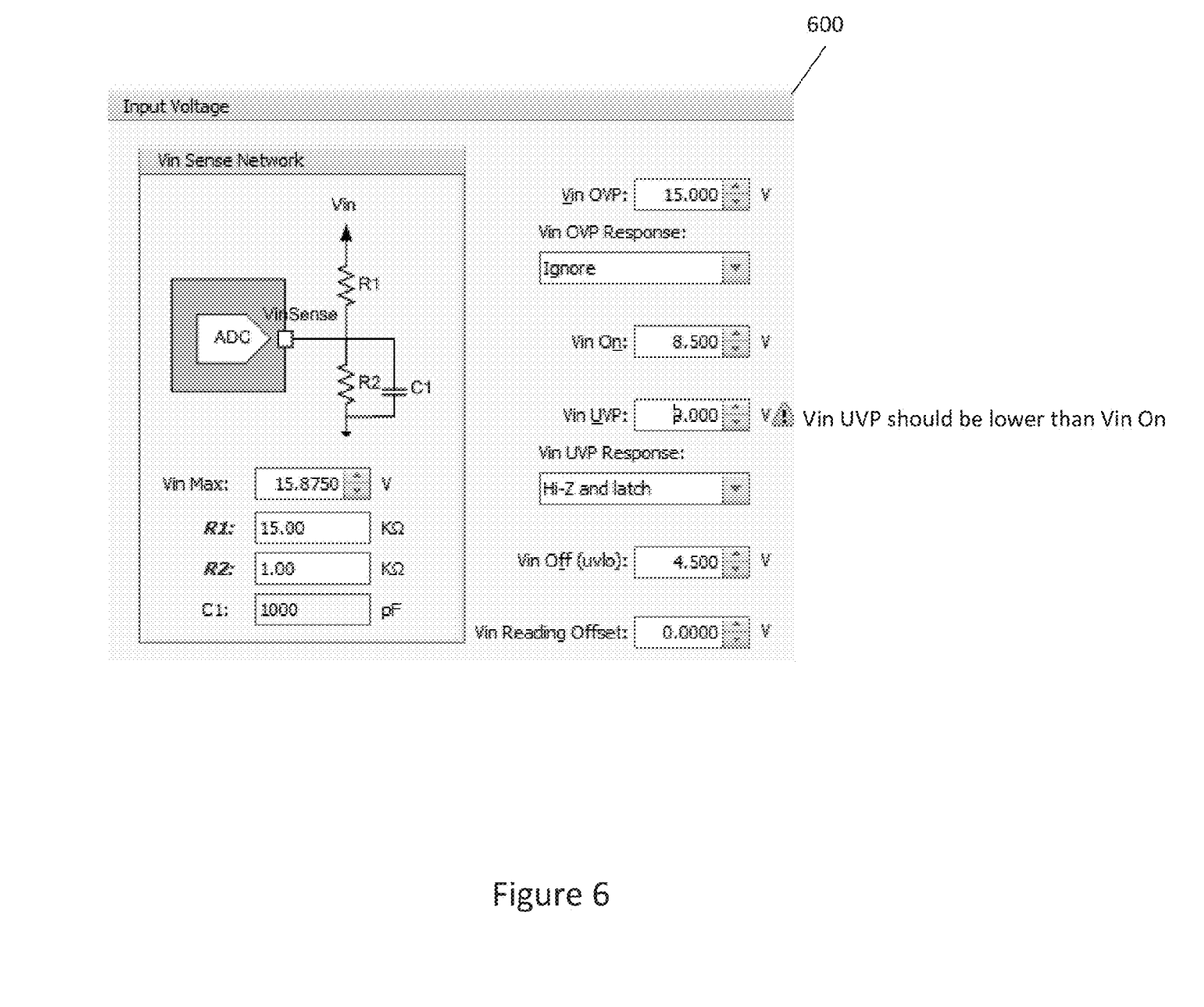
FIG. 6 illustrates another screen capture of rule-based register checking results for a digital voltage regulator controller.

FIG. 6 illustrates another embodiment of a window 600 presented by the display 410 of the GUI based controller parameter configuration system 100. In this case, the user can determine various values for an input voltage (Vin) sense network of the digital voltage regulator controller 140. The user can select the maximum input voltage (Vin Max) and the component values (R1, R2, C1) of the input sense network. The user can also select an over-voltage protection value for Vin (Vin OVP), whether the over-voltage protection should be ignored, the input voltage in the on-state (Vin On), the input voltage in the off-state (Vin Off), an offset value for reading Vin, an under voltage protection threshold for Vin (Vin UVP), and the type of under voltage protection response for Vin. In the example shown in FIG. 6, the user attempts to set Vin UVP to a value (9.000 V) higher than Vin On (8.500 V).

The rule-based checker 120 accessed by the GUI based configuration system 100 includes a rule which generates a warning (!) indicating that the user has selected an undesirable value for Vin UVP since Vin UVP should be lower than Vin On. Instead of a warning, the rule implemented by the rule-based checker 120 could outright prevent the user from selecting a value for Vin UVP that is higher than the selected value for Vin On. The acceptable component values and/or thresholds for the input voltage (Vin) sense network may change on occasion. The embodiments described herein allow for one or more of these component values and thresholds to be updated without requiring a new release of the GUI based controller parameter configuration system 100 e.g. by updating the corresponding values in a lookup table 124 such as the lookup table shown in FIG. 3 or by modifying the corresponding rule-based checking function 122.

Figure 7:
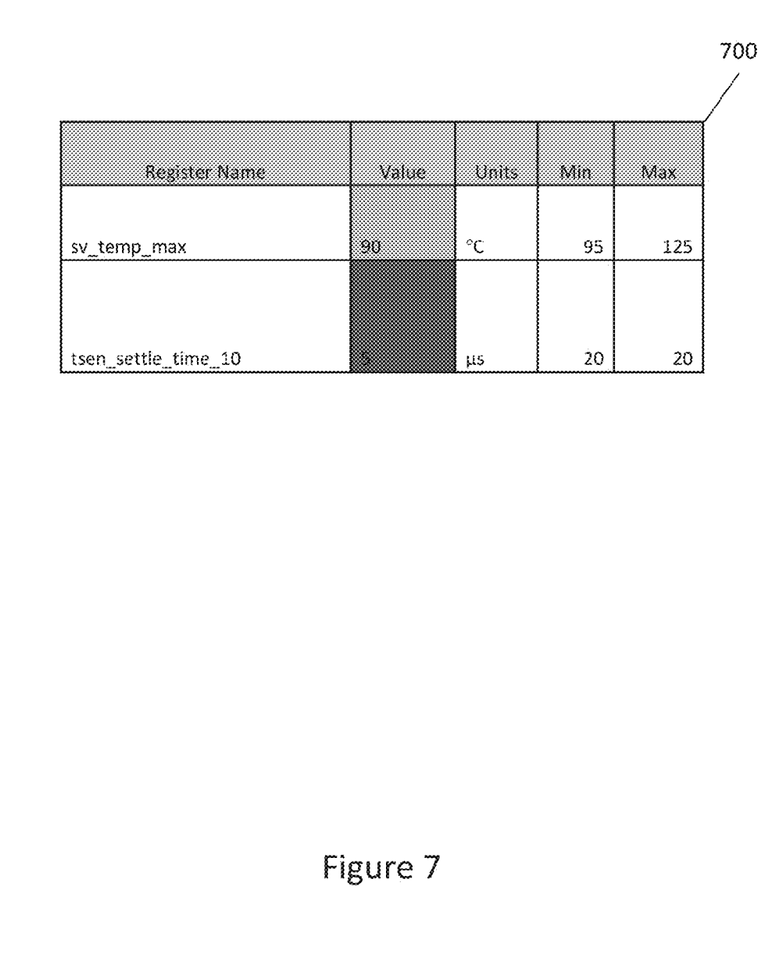
FIG. 7 illustrates yet another screen capture of rule-based register checking results for a digital voltage regulator controller.

FIG. 7 illustrates yet another embodiment of a window 700 presented by the display 410 of the GUI based controller parameter configuration system 100. In this case, the rule-based checking results are displayed for two different register settings: a temperature setting sv_temp_max and a settling time setting tsen_settle_time_10. The temperature setting sv_temp_max has mix and max values measured in ° C. The user sets the temperature parameter sv_temp_max to 90° C. in this example, which is below the min value of 95° C. As such, the rule-based checker 120 accessed by the GUI based configuration system 100 includes a rule which generates a warning that indicates the selected value for the temperature setting sv_temp_max is set below the min value of 95° C. The settling time setting tsen_settle_time_10 has min and max values measured in µs. The user sets the settling time setting tsen_settle_time_10 to 5 µs in this example, which is below the min value of 20 µs.

The rule-based checker 120 accessed by the GUI based configuration system 100 includes a rule which generates an error that indicates the selected value for the settling time setting tsen_settle_time_10 has violated a hard rule. Instead of a warning or error indication, the rule implemented by the rule-based checker 120 could outright prevent the user from selecting a value for either or both of the register settings so that the user is not permitted to select values outside the ranges identified by the corresponding rules. The acceptable thresholds for these parameters may change on occasion. The embodiments described herein allow for one or more of these thresholds to be updated without requiring a new release of the GUI based controller parameter configuration system 100 e.g. by updating the corresponding values in a lookup table 124 such as the lookup table shown in FIG. 3 or by modifying the corresponding rule-based checking function 122.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions can be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions can also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts can be embodied in hardware and/or in software (including firmware, resident software, microcode, etc.) running on a processor such as a digital signal processor, which can collectively be referred to as "circuitry," "a module" "a controller" or variants thereof.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of rule-based register checking for a digital voltage regulator controller, the method comprising:
providing the digital voltage regulator controller;
defining register settings for the digital voltage regulator controller via a GUI (graphical user interface) based controller parameter configuration system;
accessing a rule-based checker by the GUI based configuration system to check for rule violations in the register settings;
uploading the register settings from the GUI based configuration system to the digital voltage regulator controller after checking the register settings for rule violations;
updating one or more rules implemented by the rule-based checker as part of checking for rule violations in the register settings, without requiring a new release of the GUI based controller parameter configuration system,
wherein accessing the rule-based checker by the GUI based configuration system comprises launching a computer program via the GUI based controller parameter configuration system that checks the register settings for rule violations,
wherein updating one or more of the rules implemented by the rule-based checker comprises updating one or more rule-based checking functions and/or table look-ups implemented by the computer program without requiring a new release of the GUI based controller parameter configuration system,
wherein at least one of:
one or more of the rule-based checking functions includes interdependencies between values contained in different registers of the digital voltage regulator controller, and updating one or more of the rule-based checking functions comprises modifying one or more of the interdependent register values without requiring a new release of the GUI based controller parameter configuration system;
one or more of the rule-based checking functions depend on voltage regulator type, and updating one or more of the rule-based checking functions comprises modifying one or more settings associated with at least one type of voltage regulator without requiring a new release of the GUI based controller parameter configuration system; and
updating one or more of the rules implemented by the rule-based checker comprises modifying at least one minimum and/or maximum voltage regulator parameter value used by the computer program to check whether one or more of the register settings violates a rule, without requiring a new release of the GUI based controller parameter configuration system.

2. The method of claim 1, wherein at least part of the rule-based checker is implemented by the GUI based controller parameter configuration system, and wherein updating one or more of the rules implemented by the rule-based checker comprises modifying at least one minimum and/or maximum voltage regulator parameter value used by the GUI based controller parameter configuration system to check whether one or more of the register settings violates a rule, without requiring a new release of the GUI based controller parameter configuration system.

3. The method of claim 2, wherein modifying the at least one minimum and/or maximum voltage regulator parameter value comprises updating one or more tables of minimum and maximum voltage regulator register values accessed by the GUI based controller parameter configuration system to implement at least part of the rule-based checker without requiring a new release of the GUI based controller parameter configuration system, each of the tables corresponding to a different rule-checking scenario.

4. The method of claim 2, wherein another part of the rule-based checker is implemented by a computer program launched by the GUI based controller parameter configuration system, and wherein updating one or more of the rules implemented by the rule-based checker comprises updating one or more rule-based checking functions implemented by the computer program without requiring a new release of the GUI based controller parameter configuration system.

5. The method of claim 1, further comprising:
displaying results of the rule-based checker via the GUI based controller parameter configuration system; and
indicating which of the register settings are flagged for an error by the rule-based checker and which of the user-programmed register settings are flagged for a warning by the rule-based checker.

6. A non-transitory computer readable medium storing a computer program operable to implement rule-based register checking for a preexisting digital voltage regulator controller, the computer program comprising:
program instructions to define register settings for the preexisting digital voltage regulator controller via a GUI (graphical user interface) based controller parameter configuration system;
program instructions to access a rule-based checker by the GUI based configuration system to check for rule violations in the register settings;
program instructions to upload the register settings from the GUI based configuration system to the preexisting digital voltage regulator controller after checking the register settings for rule violations; and
program instructions to update one or more rules implemented by the rule-based checker as part of checking for rule violations in the register settings, without requiring a new release of the GUI based controller parameter configuration system,
wherein the program instructions to access the rule-based checker by the GUI based configuration system comprise program instructions to launch a computer program via the GUI based controller parameter configuration system that checks the register settings for rule violations, wherein the program instructions to update one or more of the rules implemented by the rule-based checker comprise program instructions to update one or more rule-based checking functions and/or table lookups implemented by the computer program without requiring a new release of the GUI based controller parameter configuration system, wherein at least one of:
one or more of the rule-based checking functions includes interdependencies between values contained in different registers of the preexisting digital voltage regulator controller, and the program instructions to update one or more of the rule-based checking functions comprises program instructions to modify one or more of the interdependent register values without requiring a new release of the GUI based controller parameter configuration system;
one or more of the rule-based checking functions depend on voltage regulator type, and the program instructions to update one or more of the rule-based checking functions comprises program instructions to modify one or more settings associated with at least one type of voltage regulator without requiring a new release of the GUI based controller parameter configuration system; and
the program instructions to update one or more of the rules implemented by the rule-based checker comprise program instructions to modify at least one minimum and/or maximum voltage regulator parameter value used by the computer program to check whether one or more of the register settings violates a rule, without requiring a new release of the GUI based controller parameter configuration system.

7. The non-transitory computer readable medium of claim 6, wherein at least part of the rule-based checker is implemented by the GUI based controller parameter configuration system, and wherein the program instructions to update one or more of the rules implemented by the rule-based checker comprise program instructions to modify at least one minimum and/or maximum voltage regulator parameter value used by the GUI based controller parameter configuration system to check whether one or more of the register settings violates a rule, without requiring a new release of the GUI based controller parameter configuration system.

8. The non-transitory computer readable medium of claim 7, wherein the program instructions to modify the at least one minimum and/or maximum voltage regulator parameter value comprise program instructions to update one or more tables of minimum and maximum voltage regulator register values accessed by the GUI based controller parameter configuration system to implement at least part of the rule-based checker without requiring a new release of the GUI based controller parameter configuration system, each of the tables corresponding to a different rule-checking scenario.

9. The non-transitory computer readable medium of claim 7, wherein another part of the rule-based checker is implemented by a computer program launched by the GUI based controller parameter configuration system, and wherein the program instructions to update one or more of the rules implemented by the rule-based checker comprise program instructions to update one or more rule-based checking functions implemented by the computer program without requiring a new release of the GUI based controller parameter configuration system.

10. The non-transitory computer readable medium of claim 6, further comprising:
program instructions to display results of the rule-based checker via the GUI based controller parameter configuration system; and
program instructions to indicate which of the register settings are flagged for an error by the rule-based checker and which of the user-programmed register settings are flagged for a warning by the rule-based checker.

11. A method of rule-based register checking for a digital voltage regulator controller, the method comprising:
providing the digital voltage regulator controller;
defining register settings for the digital voltage regulator controller via a GUI (graphical user interface) based controller parameter configuration system;
accessing a rule-based checker by the GUI based configuration system to check for rule violations in the register settings;
uploading the register settings from the GUI based configuration system to the digital voltage regulator controller after checking the register settings for rule violations; and
updating one or more rules implemented by the rule-based checker as part of checking for rule violations in the register settings, without requiring a new release of the GUI based controller parameter configuration system,
wherein at least part of the rule-based checker is implemented by the GUI based controller parameter configuration system,
wherein updating one or more of the rules implemented by the rule-based checker comprises modifying at least one minimum and/or maximum voltage regulator parameter value used by the GUI based controller parameter configuration system to check whether one or more of the register settings violates a rule, without requiring a new release of the GUI based controller parameter configuration system.

12. The method of claim 11, wherein modifying the at least one minimum and/or maximum voltage regulator parameter value comprises updating one or more tables of minimum and maximum voltage regulator register values accessed by the GUI based controller parameter configuration system to implement at least part of the rule-based checker without requiring a new release of the GUI based controller parameter configuration system, each of the tables corresponding to a different rule-checking scenario.

13. The method of claim 11, wherein another part of the rule-based checker is implemented by a computer program launched by the GUI based controller parameter configuration system, and wherein updating one or more of the rules implemented by the rule-based checker comprises updating one or more rule-based checking functions implemented by the computer program without requiring a new release of the GUI based controller parameter configuration system.

14. A non-transitory computer readable medium storing a computer program operable to implement rule-based register checking for a preexisting digital voltage regulator controller, the computer program comprising:
program instructions to define register settings for the preexisting digital voltage regulator controller via a GUI (graphical user interface) based controller parameter configuration system;

program instructions to access a rule-based checker by the GUI based configuration system to check for rule violations in the register settings;

program instructions to upload the register settings from the GUI based configuration system to the preexisting digital voltage regulator controller after checking the register settings for rule violations; and program instructions to update one or more rules implemented by the rule-based checker as part of checking for rule violations in the register settings, without requiring a new release of the GUI based controller parameter configuration system, wherein at least part of the rule-based checker is implemented by the GUI based controller parameter configuration system, wherein the program instructions to update one or more of the rules implemented by the rule-based checker comprise program instructions to modify at least one minimum and/or maximum voltage regulator parameter value used by the GUI based controller parameter configuration system to check whether one or more of the register settings violates a rule, without requiring a new release of the GUI based controller parameter configuration system.

15. The non-transitory computer readable medium of claim 14, wherein the program instructions to modify the at least one minimum and/or maximum voltage regulator parameter value comprise program instructions to update one or more tables of minimum and maximum voltage regulator register values accessed by the GUI based controller parameter configuration system to implement at least part of the rule-based checker without requiring a new release of the GUI based controller parameter configuration system, each of the tables corresponding to a different rule-checking scenario.

16. The non-transitory computer readable medium of claim 14, wherein another part of the rule-based checker is implemented by a computer program launched by the GUI based controller parameter configuration system, and wherein the program instructions to update one or more of the rules implemented by the rule-based checker comprise program instructions to update one or more rule-based checking functions implemented by the computer program without requiring a new release of the GUI based controller parameter configuration system.

* * * * *